3,751,433
2-HYDROXY-2-(3-ACYL-4-OXOALKYL)-6-VINYL-
TETRAHYDROPYRANS AND TAUTOMERS
Gabriel Saucy, Essex Fells, N.J., assignor to Hoffmann-
La Roche Inc., Nutley, N.J.
No Drawing. Original application Jan. 19, 1970, Ser. No.
4,026, now Patent No. 3,671,539. Divided and this
application Mar. 29, 1972, Ser. No. 239,369
Int. Cl. C07d 7/04
U.S. Cl. 260—345.9                3 Claims

ABSTRACT OF THE DISCLOSURE 2-hydroxy-2-(3-acyl-4-oxoalkyl) - 6 - vinyltetrahydropyrans and tautomers thereof are intermediates useful in the preparation of pharmaceutically valuable steroidal compounds. Preparation of such compounds from 2-(2'-substituted aminoethyl)-2-hydroxy - 6 - vinyltetrahydropyrans and their alkyl substituted analogs are described.

RELATED APPLICATIONS

This application is a divisional of copending application Ser. No. 4,026, filed Jan. 19, 1970 and now U.S. Pat. No. 3,671,539, entitled "Preparation of Aminoethyl Isoxazolyl Substituted Tetrahydropyrans and Intermediates Therefor."

BRIEF DESCRIPTION OF THE INVENTION

The present invention relates to novel processes useful in the preparation of compounds of the following formula

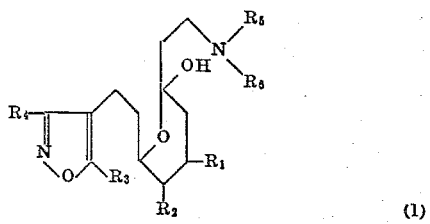

(1)

where $R_1$, $R_2$ and $R_3$ are selected from the group consisting of hydrogen and lower alkyl; $R_3$ is selected from the group consisting of hydrogen, lower alkyl, lower alkylaryl and aralkyl; $R_5$ taken independently is hydrogen or lower alkyl; $R_6$ taken independently is lower alkyl or aralkyl; and $R_5$ and $R_6$ taken together with the adjacent nitrogen atom form a 5 or 6 membered saturated heterocyclic ring including at the most one additional hetero atom selected from the group consisting of nitrogen and oxygen.

As used herein the term "lower alkyl" is meant to include both branched and straight chain hydrocarbon radicals having from 1 to 7, preferably 1 to 4 carbon atoms. Examples of suitable lower alkyl groups include methyl, ethyl, propyl and butyl. Examples of suitable lower alkyl aryl groups include tolyl, xylyl and the like. The term "aralkyl" is meant to include groups such as phenyl-lower alkyl, e.g., benzyl and phenylethyl.

The processes of the present invention utilized in the preparation of compounds of Formula I above are more readily understood by reference to the following reaction scheme:

REACTION SCHEME

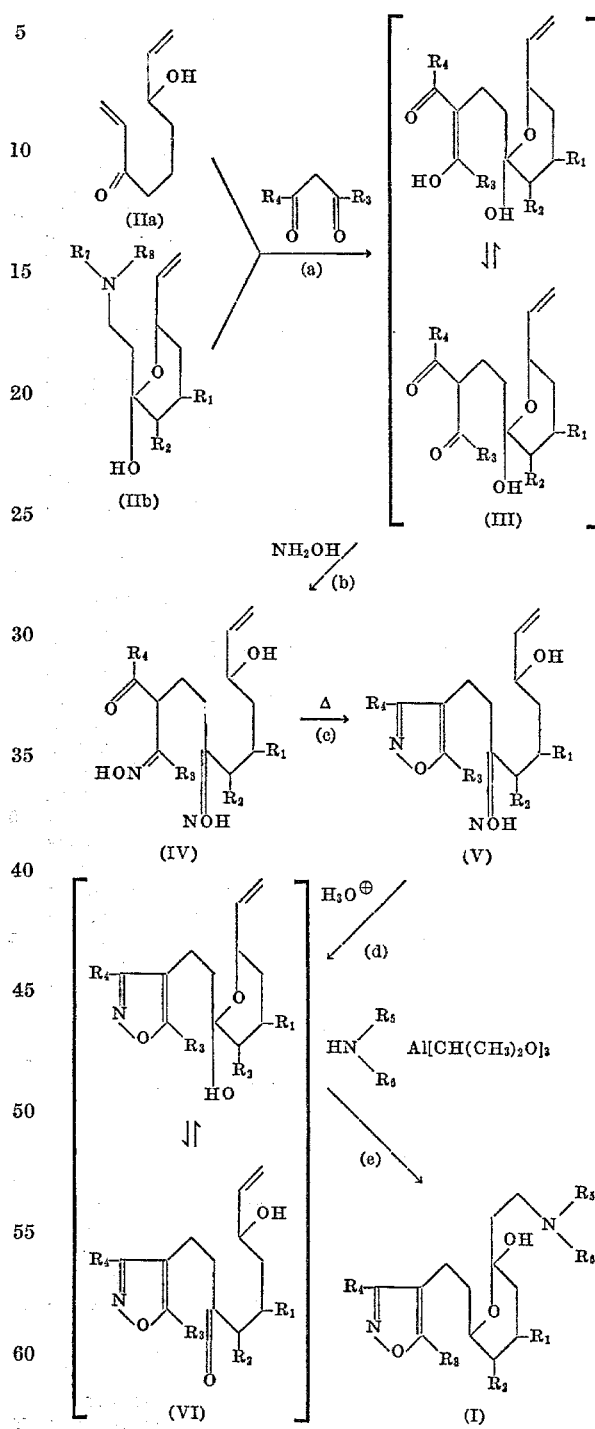

where $R_1$, $R_2$, $R_3$, $R_4$, $R_5$ and $R_6$ are as above; and $R_7$ and $R_8$ are defined as $R_5$ and $R_6$ respectively both independently and when taken together.

In step (a) of the process of the present invention compounds of Formulae IIa or IIb are reacted with a diketone compound of the following formula

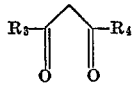

(VII)

where $R_3$ and $R_4$ are as above.

The reaction sequence outlined in the above reaction scheme utilizes either vinyl ketones of the structure shown in Formula IIa or amino ketones of Formula IIb as alternative starting materials. It is to be noted that when the amino ketones of Formula IIb are placed in solution some of this compound is converted to the vinyl ketone of Formula IIa. Either type of compound or mixtures thereof can be used as starting material. The amino moiety represented by $R_7R_8N-$ in Formula IIb can be a lower alkyl amine such as methylamine, ethylamine, propylamine, n-butylamine, hexylamine, etc., preferably n-butylamine; aralkylamines such as α-methylbenzylamine or amines of complex molecules such as, for example, dehydroabietylamine. Suitable amino groups also include di-lower alkylamines which may optionally contain additional substituents on the alkyl group, e.g., phenyl or cyclic amino groups. Examples of such di-substituted amines include dimethylamine, diethylamine, methylethylamine and the like. Diethylamine is preferred. The amino moiety may also comprise a cyclic group optionally containing an additional hetero atom in the ring. Examples of cyclic amines include pyrrolidine and piperidine. Morpohline is an example of a cyclic amine having an additional hetero atom.

The preparation of starting materials of Formula IIb is described in some detail in U.S. patent application Ser. No. 834,547, filed June 18, 1969, inventor Gabriel Saucy, and also in Ser. No. 830,491, filed June 4, 1969, inventor Gabriel Saucy.

This reaction is conveniently conducted at a temperature in the range of from about 20 to 200° C., most preferably at the reflux temperature of a suitably high boiling inert organic solvent. Suitable inert organic solvents for this purpose include the aromatic hydrocarbons, most preferably xylene or toluene. The reaction product obtained is a compound of Formula III which as indicated in the above reaction scheme is believed to exist as an equilibrium mixture of the two structures shown. Infrared and nuclear magnetic resonance spectra indicate that a predominant form in this equilibrium is the enol form. However, it is understood that this equilibrium can be shifted by changes in the ambient conditions such as temperature, selection of solvent system, and the pH of the solution. The exact structure of compounds of Formula III is not believed to be critical to the practice of the present invention since both of the indicated forms are useful in further transformations. It is also possible to use compounds of Formula III in crude form for such further transformations.

Compounds of Formula III are then treated with hydroxylamine or a salt thereof in step (b) to yield mixed isomers of the bisoxime of Formula IV. This reaction is conveniently conducted at a temperature in the range of from about −20 to 100° C., most preferably at about room temperature. Suitable salts of hydroxylamine include the mineral acid salts of hydroxylamine, most preferably the hydrochloride salt. This reaction is most desirably conducted in the presence of an organic base, most preferably a tertiary amine such as a tri-lower alkyl-amine, e.g., triethylamine.

In step (c) the above bis-oxime of Formula IV is converted by heating to the isoxazole oxime of Formula V. Suitable solvents for use in this transformation step include organic solvents having a boiling point above about 50–200° C., and include, for example, aromatic hydrocarbons such as toluene and xylene. Generally, the reaction is most desirably conducted at the reflux temperature of the solvent medium. Compounds of Formula V need not be purified prior to undergoing the next process step in the reaction scheme.

In step (d) compounds of Formula V are subjected to aqueous acid hydrolysis to yield compounds of Formula VI. It is understood that compounds of Formula VI may exist as an equilibrium tautomeric mixture of the indicated tetrahydropyranol form and the corresponding open hydroxy ketone compounds. Particularly suitable aqueous acids for use in the above hydrolysis step include the mineral acids, e.g., sulfuric acid, hydrochloric acid, phosphoric acid and the like. A most preferred aqueous acid for this purpose is dilute sulfuric acid, e.g., 1 N sulfuric acid. The hydrolysis reaction may conveniently be conducted at a temperature in the range of from about 0° to 100° C., most preferably at about room temperature. The reaction may also be conducted in the presence of an added inert organic solvent. Suitable solvents for this purpose include ketones such as acetone and methyl ethyl ketone. Acetone is the solvent of preference for this purpose.

In the final reaction step, step (e), compounds of Formula VI are converted to compounds of Formula I by treatment of the former compounds with a reaction medium comprising a metal alkoxide and an organic amine. Suitable metal alkoxides useful in the practice of this reaction step include the aluminum lower alkoxides and sodium lower alkoxides, e.g., aluminum isopropoxide and sodium methoxide. Aluminum isopropoxide is the agent of greatest preference in this reaction step.

The amine compound may be represented by the formula $R_5R_6NH$. Examples of suitable amines include the lower alkylamines such as methylamine, ethylamine, propylamine, n-butylamine, hexylamine, etc., most preferably n-butylamine; alkylamines such as α-methylbenzylamine or amines of complex molecules such as, for example, dehydroabietylamine. Suitable amines also include the di-lower alkylamines which may optionally contain additional substituents on the alkyl group, e.g., phenyl or cyclic amino groups. Examples of such di-substituted amines include dimethylamine, diethylamine, methylethylamine and the like. Diethylamine is preferred. The amine compound may also comprise a cyclic group optionally containing an additional hetero atom in the ring. Examples of cyclic amines include pyrrolidine and piperidine. Morpholine is an example of a cyclic amine having an additional hetero atom.

In a particularly preferred embodiment optionally active amines are employed in step (e). A highly desirable amine for this purpose is (−)-α-phenethylamine. Use of optically active amines in reaction step (e) results in the formation of mixtures of diastereoisomers of compounds of Formula I. Fractional crystallization of this mixture results in the preparation of optically active compounds of Formula I which are eminently suitable as intermediates in the preparation of optically active steroids of valuable pharmacological properties.

Temperature conditions useful in the practice of reaction step (e) include a temperature in the range of from about 0° C. to the reflux temperature of the reaction medium, most preferably at about the reflux temperature of the reaction medium. This reaction may conveniently be conducted in the presence of an inert organic solvent. Suitable solvents for this purpose include aromatic hydrocarbons such as benzene, toluene and xylene.

While it is highly desirable to utilize the metal alkoxide and the organic amine simultaneously in a single reaction medium to effectuate the conversion of compounds of Formula VI to compounds of Formula I it is also possible to add these reagents stepwise. In such event an intermediate compound having the structure represented by Formula VIII is believed to be obtained in the reaction mixture.

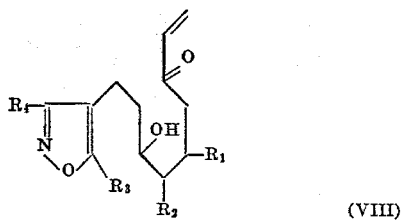

(VIII)

where $R_1$, $R_2$, $R_3$ and $R_4$ are as above.

A by-product obtained from the process of step (e) is the isomeric 5-hydroxy compound of the formula:

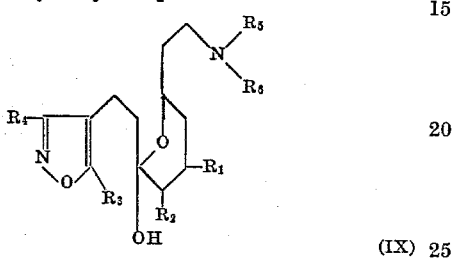

(IX)

where $R_1$, $R_2$, $R_3$, $R_4$, $R_5$ and $R_6$ are as above.

Compounds of Formula IX can be separated from the desired product of Formula I by chromatography over alumina. The compounds of Formula IX can be isomerized to give a mixture containing a major amount of compounds of Formula I by treatment of the former compounds with the metal alkoxide under the conditions used in step (e).

The compounds of Formulae III, IV, V and VI above are novel intermediates and as such form a part of the present invention. Preferred embodiments of the process and compound aspects of the present invention are obtained when $R_1$ and $R_2$ both are hydrogen, $R_3$ and $R_4$ both are lower alkyl, $R_5$ is hydrogen or lower alkyl, most preferably ethyl, $R_6$ is lower alkyl, most preferably ethyl or aralkyl, most preferably phenethyl, and $R_7$ and $R_8$ both are lower alkyl, most preferably ethyl.

Starting materials of Formula II may be prepared in accordance with procedures described in detail in U.S. patent application Ser. No. 818,142, filed Apr. 21, 1969, and now U.S. Pat. No. 3,631,039, title, Preparation of Tricyclic Intermediates, inventors, David Andrews and Gabriel Saucy.

The conversion of compounds of Formula I into racemic or optically active 19-norsteroids of known pharmacological value is described in detail in U.S. patent application Ser. No. 778,314, filed Nov. 22, 1968, and now U.S. Pat. No. 3,700,661, inventors Gabriel Saucy and John William Scott.

The present invention will be more clearly understood by reference to the following examples.

EXAMPLE 1

Preparation of 2-hydroxy-2-(3-acetyl-4-oxo-pentyl)-6-vinyltetrahydropyran

Into a 500 ml. flask equipped with condenser, thermometer, nitrogen inlet and magnetic stirrer were placed 45.4 g. of 2-[2'-diethylaminoethyl]-2-hydroxy-6-vinyltetrahydropyran, 40.0 g. of 2,4-pentanedione and 250 ml. of toluene. The mixture was degassed, placed under nitrogen and heated 3½ hours at reflux. At this point, 20.0 g. of 2,4-pentanedione was added and heating at reflux was continued three more hours. The solution was then cooled, transferred to a round bottom flask and evaporated in vacuo (60° C., 15 mm. Hg) with agitation. The resulting oil was then placed under high vacuum at 50° C. with agitation to ensure removal of the last traces of excess 2,4-pentanedione. There was thus obtained the above-titled product in a yield of 63.2 g. as an orange-red oil. A sample of this material was purified by chromatography on silica gel. UV and NMR analysis showed the β-diketone system to be enolic to the extent of about 20 percent (in chloroform at 25° C.).

Calcd. for $C_{14}H_{22}O_4$ (percent): C, 66.11; H, 8.72. Found (percent): C, 66.27; H, 8.63.

EXAMPLE 2

Preparation of 3-acetyl-10-hydroxy-2,7-dihydroxyimino-dodec-11-ene

Into a 2-liter flask equipped with mechanical stirrer were placed 63.2 g. of crude 2-hydroxy-2-(3-acetyl-4-oxopentyl)-6-vinyltetrahydropyran, 450 ml. of absolute ethanol, 89 ml. of triethylamine and 28.0 g. of hydroxylamine hydrochloride. A slight temperature rise occurred when the hydrochloride was added. The slurry was stirred at room temperature for 8 hours as the hydrochloride gradually dissolved. The resulting solution was evaporated to dryness with agitation at 60° C. and 15 mm. Hg. Small portions of toluene were added to the residue to remove the last traces of ethanol. The resulting pasty mixture comprised the above-titled product and triethylamine hydrochloride and can be utilized in crude form in further transformations.

EXAMPLE 3

Preparation of 1-(3,5-dimethyl-4-isoxazolyl)-7-hydroxy-3-hydroxyimino-non-8-ene

The crude mixture of the dioxime and triethylamine hydrochloride obtained in Example 2 was combined with 700 ml. of toluene and the mixture was degassed. It was then placed under nitrogen and heated at reflux for three hours. The resulting slurry was cooled, stirred with 500 ml. of water and the mixture was transferred to a separatory funnel with ether rinsing. The aqueous phase was separated and extracted twice with ether. The combined ether extracts and toluene layer were then extracted with 2 × 50 ml. and then 1 × 25 ml. of Claisen's alkali which is made by dissolving 70 g. of potassium hydroxide in 50 ml. of water, cooling, adding 200 ml. of methanol and cooling again before use. The combined alkali extracts were washed with 3 × 50 ml. of 1:1 ether/benzene mixture and the washings were discarded. The washed alkali solution was then combined with an equal volume of methylene chloride in an Erlenmeyer flask and neutralized by the dropwise addition of acetic acid with stirring and external cooling to maintain the temperature at 25° C. or less. When pH 6 was obtained, the mixture was transferred to a separatory funnel and 125 ml. of saturated brine was added. At the start of shaking, the organic layer was separated and the aqueous phase was extracted twice with 100 ml. portions of methylene chloride. The combined organic phase and methylene chloride extracts were washed with 100 ml. of 1:1 saturated brine/saturated sodium bicarbonate solutions, dried over anhydrous sodium sulfate and vacuum evaporated at 60° C. and 15 mm. Hg with agitation to give 38.2 g. of 1 - (3,5-diethyl - 4-isoxazolyl)-7-hydroxy-3-hydroxyimino-non-8-ene as a brown viscous oil. A sample of this product was purified by column chromatography and then analyzed. Based on the IR and NMR spectra, the oxime group is present in both its syn and anti form.

Calcd. for $C_{14}H_{22}N_2O_3$ (percent): C, 63.13; H, 8.33; N, 10.52. Found (percent): C, 63.26; H, 8.50; N, 10.33.

EXAMPLE 4

Preparation of 1-(3,5-dimethyl-4-isoxazolyl)-7-hydroxy-non-8-en-3-one

A total of 38.2 g. of crude 1-(3,5-dimethyl-4-isoxazolyl)-7-hydroxy-3-hydroxyimino-non-8-ene was dissolved in 225 ml. of acetone and 100 ml. of 1 N sulfuric acid was added with stirring. The solution was allowed to stand at room temperature for two days and was then vacuum evaporated at 35° C. and 15 mm. Hg to remove the organic solvent. The resulting aqueous emulsion was partitioned between 250 ml. of water and 200 ml. of methylene chloride. The aqueous phase was extracted with 100 ml. of methylene chloride and the combined organic extracts were washed with 100 ml. of 1:1 saturated brine/saturated sodium bicarbonate solution. The organic phase was dried over anhydrous sodium sulfate, filtered and evaporated in vacuo to give 31.8 g. of crude product as a brown oil. The product can be purified by passage through a chromatographic column packed with alumina (activity III) and using benzene as eluting solvent until first product appears and then eluting the remainder of the product from the column using a 9:1 benzene/ether mixture. A sample of this product was further purified by short-path distillation; B.P. ~179° C. at 0.2 mm. Hg.

Calcd. for $C_{14}H_{21}NO_3$ (percent): C, 66.91; H, 8.42; N, 5.57. Found (percent): C, 66.88; H, 8.40; N, 5.32.

EXAMPLE 5

Preparation of 2-(diethylamino)-6-(2-[3,5-dimethyl-4-isoxazolyl]-ethyl)-tetrahydropyran-2-ol A total of 100 mg. of 1-(3,5-dimethyl-4-isoxazolyl)-7-hydroxy-non-8-en-3-one was allowed to react with 25 mg. of aluminum isopropoxide and 0.1 ml. of diethylamine in 5 ml. of refluxing toluene for one and one-half hours under a nitrogen atmosphere. After cooling, the reaction mixture was chromatographed on 5 g. of silica gel using benzene-diethylamine (99:1) and (19:1) mixtures as eluants. A total of 127.8 mg. of product as an oil was obtained upon evaporation of the first 6× 5 ml. fractions. This material was rechromatographed on 3.6 g. of alumina (activity III). Elution with benzene and benzene containing 2% of diethylamine (total of 6× 4 ml.) gave pure product 2-(diethylamino)-6-(2-[3,5-dimethyl-4-isoxazolyl]-ethyl)-tetrahydropyran-2-ol as an oil after evaporation of the solvents in vacuo. A total of 95 mg. of desired product was obtained in this fashion. The IR spectrum of this material exhibited typical bands at 1640 cm.$^{-1}$ (isoxazole moiety), 1710 cm.$^{-1}$ (carbonyl) and ~3400 (bonded OH). The compound had a UV maximum (in ethanol) at 220 m$\mu$, $\epsilon$=5350.

Elution of the column with more benzene-diethylamine afforded the considerably more polar isometric 5-hydroxy compound. When this material was refluxed for three hours with aluminum isopropoxide in diethylamine-benzene a mixture of the desired 2-hydroxy and 5-hydroxy compounds in the respective ratio of about 2:1 was obtained. This mixture may be separated by using the chromatographic procedure above.

EXAMPLE 6

Preparation of 2S,6R-[2-(S-α-phenethylamino)ethyl]-6-[2-(3,5-dimethyl-4-isoxazolyl)ethyl]-tetrahydropyran-2-ol A total of 1.25 g. of 1-(3,5-dimethyl-4-isoxazolyl)-7-hydroxy-non-8-en-3-one was reacted with 300 mg. of aluminum isopropoxide and 908 mg. of (—)-phenethylamine in 36 ml. of refluxing toluene for 1 hour under a nitrogen atmosphere. The reaction mixture was washed first with water and then with 3 N hydrochloric acid (3× 20 ml.). The acid extract was washed twice with benzene and then treated with 10 N sodium hydroxide and ice to bring the pH to about 11. Extraction with 3× 50 ml. of benzene, washing with brine, drying over sodium sulfate, followed by filtration and evaporation to dryness afforded 1.50 g. of crude product as an oil. This material was chromatographed on 75 g. of alumina (activity III). Elution with benzene (75 ml. fractions) gave, after evaporation of the solvent, 518 mg. of product obtained from fractions 3–9 of thin-layer chromatographically pure product (a mixture of two diastereoisomers) and 289 mg. of slightly impure product.

The pure material (518 mg.) was resolved by crystallization from isopropyl ether to afford optically pure (1-diastereoisomer) 2S,6R - 2-[2-(S-α-phenethylamino) ethyl]-6-[2-(3,5-dimethyl-4 - isoxazolyl)ethyl] - tetrahydropyran-2-ol; M.P. 68–71.5° C.; $[\alpha]_D^{25}$= —20.02 (c.= 1.0 in benzene).

What is claimed is:
1. A compound of the formula

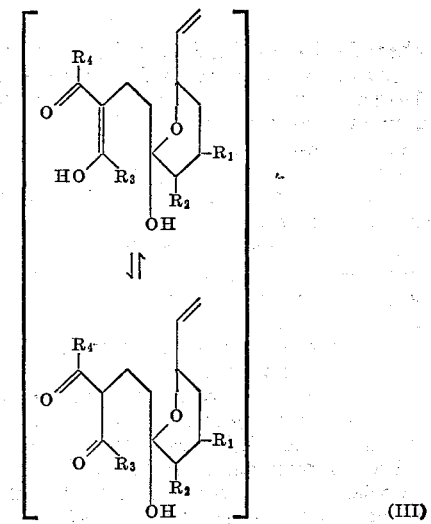

(III)

where $R_1$, $R_2$ and $R_4$ are selected from the group consisting of hydrogen and lower alkyl; $R_3$ is selected from the group consisting of hydrogen, lower alkyl, lower alkyl phenyl and phenyl lower alkyl.

2. The compound of claim 1 wherein $R_1$ and $R_2$ are hydrogen and $R_3$ and $R_4$ are lower alkyl.

3. The compound of claim 2 which is 2-hydroxy-2-(3-acetyl-4-oxopentyl)-6-vinyltetrahydropyran.

No references cited.

NORMA S. MILESTONE, Primary Examiner